United States Patent [19]

Sugio et al.

[11] Patent Number: 4,614,773
[45] Date of Patent: Sep. 30, 1986

[54] NOVEL POLYPHENYLENE ETHER RESIN COMPOSITION

[75] Inventors: Akitoshi Sugio, Ohmiya; Masao Okabe, Abiko; Akikazu Amagai, Tokyo, all of Japan

[73] Assignee: Mitsubishi Gas Chemical Company, Inc., Tokyo, Japan

[21] Appl. No.: 689,895

[22] Filed: Jan. 9, 1985

[30] Foreign Application Priority Data

Jan. 10, 1984 [JP] Japan .................................. 59-2274
Feb. 29, 1984 [JP] Japan ................................ 59-37994
Jun. 4, 1984 [JP] Japan .............................. 59-114264

[51] Int. Cl.$^4$ ........................................... C08F 283/08
[52] U.S. Cl. .................................... 525/391; 524/494; 525/68; 525/92; 525/94; 525/133; 525/396; 525/397
[58] Field of Search ....................... 525/396, 397, 391

[56] References Cited

U.S. PATENT DOCUMENTS 4,456,736  6/1984  Miyashita et al. ................. 525/397

FOREIGN PATENT DOCUMENTS 179556  10/1984  Japan .................................. 525/396

Primary Examiner—Jacob Ziegler
Attorney, Agent, or Firm—Wenderoth, Lind & Ponack

[57] ABSTRACT

A polyphenylene ether resin composition containing (A) a polyphenylene ether resin, (B) an aromatic polyester resin, and (C) a phenoxy resin. The resin composition may further contain (D) an unsaturated carboxylic acid or (E) a vinyl copolymer derived from a styrene compound and an alpha,beta-unsaturated dicarboxylic acid anhydride as comonomer components. The resin composition has excellent mechanical strength, solvent resistance, oil resistance and moldability.

8 Claims, No Drawings

NOVEL POLYPHENYLENE ETHER RESIN COMPOSITION

This invention relates to a novel polyphenylene ether resin composition. More specifically, it relates to a novel polyphenylene ether resin composition having excellent mechanical strength, solvent resistance, oil resistance and moldability.

Polyphenylene ethers have superior heat resistance, rigidity and electrical properties and are useful polymeric materials as engineering plastics. It is well known however that the polyphenylene ether resins have the serious defect of suffering from poor solvent resistance, oil resistance and moldability.

Known techniques for improving the flow characteristics of the polyphenylene ethers include, for example, the blending of a polystyrene resin with the polyphenylene ethers (U.S. Pat. No. 3,383,435), and the blending of a rubber-reinforced copolymer of a styrene compound and an alpha,beta-unsaturated dicarboxylic acid anhydride with the polyphenylene ethers (Japanese Laid-Open Patent Publication No. 128947/1977). These techniques, however, do not at all improve the solvent resistance and oil resistance of the polyphenylene ethers.

Japanese Laid-Open Patent Publication No. 50050/1974 discloses a technique of improving the melt flowability of a polyphenylene ether by incorporating a polyester resin into it. Investigations of the present inventors, however, have shown that the incorporation of the polyester resin certainly improved the melt flowability of the polyphenylene ether, but if it is incorporated in an amount of at least 20% based on the resulting composition, the inherent mechanical strengths, especially tensile strength, of the polyphenylene ether are greatly impaired. The incorporation of the polyester resin improves the solvent resistance of the polyphenylene ether, but the degree of improvement of the solvent resistance is nearly proportional to the amount incorporated. Accordingly, a large amount of the polyester resin becomes necessasry in order to impart solvent resistance fully. However, the incorporation of such a large amount of the polyester resin undesirably results in a reduction in the mechanical strength of the resulting resin composition. In any case, the phenomenon of deterioration in the mechanical strength of the polyphenylene ether upon the incorporation of the polyester resin is due to the poor compatibility between the polyphenylene ether and the polyester resin.

Japanese Laid-Open Patent Publication No. 179,556/1984 describes a resin composition of improved water absorption comprising a phenoxy resin and a modified polyalkylene terephthalate modified with a polyoxyalkylene compound. Examples of the polyoxyalkylene compound are polyoxyalkylene glycols such as polyethylene glycol, polyoxyalkylene compounds containing organic acid metal salts such as a mono- or disuccinic ester potassium salt of polyethylene glycol, an epoxy group-containing polyoxyalkylene compound such as a mono- or di-glycidyl ether of polyethylene glycol, and polyoxyalkylene compounds having a hydrocarbon group at the terminal such as methoxypolyethylene glycol. The specification of the above patent document states that the polyoxyalkylene compound improves the moldability of polyalkylene terephthalates but has the defect of increasing moisture absorption, and this defect is removed by incorporation of a phenoxy resin. The patent document further discloses that another polymer such as polyolefins, polystyrene or polyphenylene oxide can be further incorporated. It is clear however that the object of the above resin composition lies in the improvement of the moldability of the polyalkylene terephthalate by the polyoxyalkylene compound.

It is an object of this invention to provide a novel polyphenylene ether resin composition.

Another object of this invention is to provide a novel polyphenylene ether resin composition having improved solvent resistance and moldability without impairing the inherent excellent mechanical strength of the polyphenylene ether resin.

Still another object of this invention is to provide a polyphenylene ether resin composition which contains an aromatic polyester having the property of reducing the mechanical properties of the polyphenylene ether resin, but has improved solvent resistance and moldability without impairing the excellent mechanical strength of the polyphenylene ether resin.

Further objects and advantages of this invention will become apparent from the following description.

According to this invention, these objects and advantages are achieved by a polyphenylene ether resin composition comprising (A) a polyphenylene ether resin,
(B) an aromatic polyester resin, and
(C) a phenoxy resin.

The polyphenylene ether resin (A) constituting the resin composition of this invention denotes a phenylene ether homopolymer or a polyphenylene ether random copolymer, and a grafted phenylene ether polymer obtained by grafting an aromatic vinyl compound to such a homo- or co-polymer of polyphenylene ether.

Preferably, the homopolymer or copolymer of polyphenylene ether is obtained by polycondensing a monocyclic phenol represented by the following formula (I)

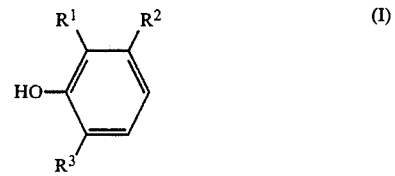

wherein $R^1$ represents a lower alkyl group having 1 to 3 carbon atoms, and $R^2$ and $R^3$, independently from each other, represent a hydrogen atom or an alkyl group having 1 to 3 carbon atoms.

The homopolymer can be obtained from a single monocyclic phenol, and the copolymer, from two or more monocyclic phenols.

The alkyl group having 1 to 3 carbon atoms in general formula (I) denotes methyl, ethyl, n-propyl and isopropyl groups.

Examples of the monocyclic phenol of general formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol. Thus, examples of polyphenylene ether resins obtained by polycondensing these monocyclic phenols include homopolymers such as poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether and poly(2-ethyl-6-propyl-1,4-phenylene)ether, and copolymers such as 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer.

Of these, poly(2,6-dimethyl-1,4-phenylene)ether and 2,6-dimethylphenol/2,3,6-trimethylphenol copolymer are preferred.

As the aforesaid graft polymer, preferred is a grafted phenylene ether polymer obained by grafting an aromatic vinyl compound represented by the following formula (II)

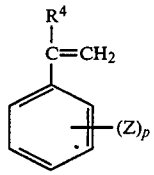
(II)

wherein $R^4$ represents a hydrogen atom or a methyl group, Z represents a halogen atom or a lower alkyl group having 1 to 3 carbon atoms, and p is 0 or an integer of 1 to 3, to the homo- or co-polymer of polyphenylene ether. The graft polymer can be produced, for example, by the method described in Japanese Laid-Open Patent Publication No. 126,800/1975. Examples of the aromatic vinyl compound are styrene, alpha-methylstyrene, vinyltoluene, vinylxylene, ethylstyrene, n-propylstyrene, iso-propylstyrene, chlorostyrene and bromostyrene.

Examples of the graft polymer include a graft polymer obtained by grafting styrene to poly(2,6-dimethyl-1,4-phenylene) ether and a graft polymer obtained by grafting styrene to 2,6-dimethylphenol/2,3,6-trimethylphenol copolymer.

The aromatic polyester resin (B) has an aromatic dicarboxylic acid as a main dicarboxylic acid component and an aliphatic diol having 2 to 10 carbon atoms as a main glycol component.

It should be understood that the aromatic dicarboxylic acid as used herein broadly denotes a dicarboxylic acid having at least one aromatic ring in the molecule. Dicarboxylic acids having carboxyl groups directly bonded to the aromatic ring are preferred. Specific examples of the aromatic dicarboxylic acid include terephthalic acid, isophthalic acid, phthalic acid, chlorophthalic acid, nitrophthalic acid, p-carboxyphenylacetic acid, p-phenylenediacetic acid, m-phenylenediglycollic acid, p-phenylenediglycollic acid, diphenyldiacetic acid, diphenyl-p,p'-dicarboxylic acid, diphenyl-m,m'-dicarboxylic acid, diphenyl-4,4'-diacetic acid, diphenylmethane-p,p'-dicarboxylic acid, diphenylethane-m,m'-dicarboxylic acid, stilbendicarboxylic acid, diphenylbutane-p,p'-dicarboxylic acid, benzophenone-4,4'-dicarboxylic acid, naphthalene-1,4-dicarboxylic acid, naphthalene-1,5-dicarboxylic acid, naphthalene-2,6dicarboxylic acid, naphthalene-2,7-dicarboxylic acid, p-carboxyphenoxyacetic acid, p-carboxyphenoxybutyric acid, 1,2-diphenoxypropane-p,p'-dicarboxylic acid, 1,3-diphenoxypropane-p,p'-dicarboxylic acid, 1,4-diphenoxybutane-p,p'-dicarboxylic acid, 1,5-diphenoxypentane-p,p'-dicarboxylic acid, 1,6-diphenoxypentane-p,p'-dicarboxylic acid, p-(p-carboxyphenoxy)benzoic acid, 1,2-bis(2-methoxyphenoxy)ethane-p,p'-dicarboxylic acid, 1,3-bis(2-methoxyphenoxy)propane-p,p'-dicarboxylic acid, 1,4-bis(2-methoxyphenoxy)butane-p,p'-dicarboxylic acid and 1,5-bis(2-methoxyphenoxy)-3-oxapentane-p,p'-dicarboxylic acid.

The aliphatic diol having 2 to 10 carbon atoms may be linear or branched, and is preferably represented by the following formula (III)

$$HO\text{-}(CH_2)_n\text{-}OH \qquad (III)$$

wherein n is a number of from 2 to 10.

Specific examples of such a diol include ethylene glycol, propylene glycol, trimethylene glycol, butane-1,3-diol, 2,2-dimethylpropane-1,3-diol, cis-2-butene-1,4-diol, trans-2-butene-1,4-diol, tetramethylene glycol, pentamethylene glycol, hexamethylene glycol, heptamethylene glycol, octamethylene glycol and decamethylene glycol. Of these, ethylene glycol, propylene glycol, trimethylene glycol, tetramethylene glycol and butane-1,3-diol are preferred. Ethylene glycol and tetramethylene glycol are especially preferred.

The aromatic polyester used in this invention can be produced by reacting the aforesaid aromatic dicarboxylic acid or its ester-forming derivative with the aforesaid aliphatic diol or its ester-forming derivative by methods known per se.

The aromatic polyester used in this invention has the aforesaid aromatic dicarboxylic acid as an dicarboxylic acid component and the aforesaid $C_2$–$C_{10}$ aliphatic glycol as a main glycol component. Preferably, the aromatic dicarboxylic acids accounts for at least 90 mole % of the dicarboxylic acid component, and the aliphatic diol having 2 to 10 carbon atoms accounts for at least 90 mole % of the glycol component. Especially preferably, at least 95 mole % of the dicarboxylic acid component is the aromatic dicarboxylic acid and at least 95 mole % of the glycol component is the aliphatic diol having 2 to 10 carbon atoms.

Examples of the dicarboxylic acid other than the aromatic dicarboxylic acids include oxalic acid, succinic acid, adipic acid, suberic acid, azelaic acid, sebacic acid, dodecanedicarboxylic acid, undecanedicarboxylic acid, maleic acid and fumaric acid.

Aromatic dihydroxy compounds such as hydroquinone, resorcinol or bisphenol A may be cited as glycols other than the aliphatic diols.

The phenoxy resin (c) is a resin produced by polycondensing a bisphenol with an epihalohydrin, and is preferably one composed mainly of recurring units of the following formula (IV)

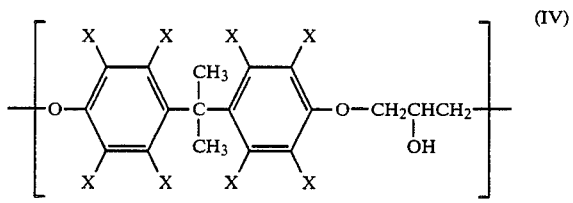

wherein X's are identical or different and each represents a hydrogen atom, a lower alklyl group having 1 to 3 carbon atoms, or a halogen atom, and n is a number of at least 20.

Examples of the lower alklyl having 1 to 3 carbon atoms in formula (IV) are methyl, ethyl, n-propyl and isopropyl. The halogen atom is, for example, chlorine or bromine.

The phenoxy resin used suitably in this invention is a polymer of formula (IV) in which n is at least 70. A more preferred phenoxy resin is a polymer derived from bisphenol A and an epihalohydrin and having an n of at least 70 in formula (IV).

The phenoxy resin can be produced by condensing bisphenol A or its nuclearly substituted product with an epihalohydrin such as epichlorohydrin in the presence of an alkali typified by sodium hydroxide. The method of production is taught, for example, by U.S. Pat. Nos. 2,602,075 and 3,305,528, and the disclosures of these patents are cited herein as part of the disclosure of the present specification.

The resin composition of this invention comprises the polyphenylene ether resin (A), the aromatic polyester resin (B) and the phenoxy resin (C). Investigations of the present inventors have shown that the resin composition of this invention which further contains an unsaturated carboxylic acid (D) and/or a specific vinyl copolymer (E) in addition to the components (A), (B) and (C) has further improved mechanical properties.

The unsaturated carboxylic acid (D) may be a carboxylic acid having a carbon-carbon double bond, or its anhydride or ester. The carboxylic acid may be a monocarboxylic acid or a polycarboxylic acid such as a di-, tri- or tetra-carboxylic acid. The acid anhydride may be an intramolecular acid anhydride or an intermolecular acid anhydride. The ester may be an ester with an aliphatic or aromatic alcohol. Examples include unsaturated monocarboxylic acids such as acrylic acid, butenoic acid, crotonic acid, vinylacetic acid, methacrylic acid, pentenoic acid, angelic acid, 2-pentenoic acid, 3-pentenoic acid, alpha-ethylacrylic acid and beta-methylcrotonic acid, and alpha,beta-unsaturated carboxylic acids such as maleic acid, chloromaleic acid, fumaric acid, citraconic acid and itaconic acid. Examples of the carboxylic acid anhydride are the intramolecular or intermolecular acid anhydrides of the above-exemplified carboxylic acids, such as acrylic anhydride or maleic anhydride. Suitable ester compounds are esters of such carboxylic acids with aliphatic or aromatic alcohols such as methanol, ethanol, propanol, butanol, allyl alcohol, benzyl alcohol and phenol.

Maleic acid, maleic anhydride, a mono- or di-ester of maleic acid, acrylic acid, acrylic anhydride, acrylic acid esters, methacrylic acid, methacrylic anhydride and methacrylic acid esters are preferred as the unsaturated carboxylic acid (D). Maleic acid, maleic anhydride and mono- and di-esters of maleic acid are more preferred. Maleic anhydride is especially preferred.

The vinyl copolymer (E) denotes either a copolymer obtained by copolymerizing a styrene compound and an alpha,beta-unsaturated dicarboxylic acid anhydride and optionally a third monomer as comonomer components, or a high-impact vinyl copolymer obtained by reinforcing the above copolymer with an elastomer.

The aromatic vinyl compounds of formula (II) given above are preferred as the styrene compound. Specific examples are styrene, p-methylstyrene, o-methylstyrene, dimethylstyrene, ethylstyrene, chlorostyrene, bromostyrene, isopropylstyrene and alpha-methylstyrene. As required, they may be used in combination.

The alpha,beta-unsaturated dicarboxylic acid anhydride, the other comonomer constituting the vinyl copolymer (E), is a vinyl monomer copolymerizable with the styrene compound. Specific examples include maleic anhydride, chloromaleic anhydride, citraconic anhydride, itanonic anhydride and aconitic anhydride. As required, they may be used in combination.

The third monomer which may optionally be used is a compound copolymerizable with the vinyl monomer, and is preferably acrylic or methacyrlic acid, esters thereof, and acrylonitrile.

The vinyl copolymer (E) can be obtained by copolymerizing the styrene compound and the alpha,beta-unsaturated dicarboxylic acid anhydride and as required, the third monomer in the presence of a radical polymerization initiator by bulk polymerization, solution polymerization, suspension polymerization, emulsion polymerization, etc. in accordance with methods known per se.

The elastomer reinforced high impact vinyl copolymer can be obtained by mixng the resulting copolymer with an elastomer, or by performing the aforesaid polymerization in the presence of an elastomer in the polymerization system. The elastomer may be the same as those described hereinafter.

Examples of the vinyl copolymer (E) preferably used are styrene/maleic anhydride copolymer, styrene/ maleic anhydride/acrylate ester copolymer, styrene/-maleic anhydride/methacrylate ester copolymer, and high-impact vinyl copolymers obtained by reinforcing these copolymers with elastomers. The styrene/maleic anhydride copolymer or an elastomer reinforced product thereof is more preferred.

The vinyl copolymer (E) contains the styrene compound units in a proportion of preferably 50 to 90 mole %, based on the total sum of the styrene compound units and the alpha,beta-unsaturated carboxyic acid anhydride units. The high impact vinyl copolymer preferably contains 1 to 20% by weight of the elastomer.

In the polyphenylene ether resin composition of this invention, the total weight of the aromatic polyester resin (B) and the phenoxy resin (C) is preferably 5 to 95% by weight, more preferably 10 to 90% by weight, based on the total weight of the polyphenylene ether resin (A), the aromatic polyester resin (B) and the phenoxy resin (C). The proportion of the phenoxy resin (C) is preferably 1 to 99% by weight, more preferably 1 to 50% by weight, based on the total weight of the aromatic polyester (B) and the phenoxy resin (C).

In the polyphenylene ether resin composition of this invention containing the unsaturated carboxylic acid (D), the total weight of the components (B), (C) and (D) is preferably 5 to 95% by weight, preferably 10 to 90% by weight, based on the total weight of the components (A), (B), (C) and (D). The proportions of the components (B), (C) and (D) are 10 to 98.5% by weight, 1 to 89.5% by weight, and 0.5 to 89% by weight, respectively, based on the total weight of these three components.

In the polyphenylene ether resin composition of this invention containing the vinyl copolymer (E), the total weight of the components (B), (C) and (E) is preferably 5 to 95% by weight, more preferably 10 to 90% by weight, based on the total weight of the compounds (A), (B), (C) and (E). The proportions of the polyester resin (B), the phenoxy resin (C) and the vinyl copolymer (E) are 10 to 89% by weight, 1 to 80% by weight and 10 to 89% by weight, respectively, based on the total weight of the three components.

Any known methods can be used to mix the ingredients in preparing the polyphenylene ether resin composition of this invention. For example, the ingredients may be melt-kneaded by means of a roll mill, a Banbury mixer, an extruder, etc. These ingredients may be mixed simultaneously. Alternatively, some of these ingredients may be mixed first, and then with the remainder. In the latter method, the ingredients may be mixed in any desired sequence. For example, there may be advantageously used a method which comprises first mixing the aromatic polyester resin (B) with the phenoxy resin (C), and then mixing the mixture with the polyphenylene ether resin (A), a method which comprises mixing the aromatic polyester resin (B), the phenoxy resin (C) and the unsaturated carboxylic acid (D), and then mixing the mixture with the polyphenylene ether resin (A), or a method which comprises mixing the aromatic polyester resin (B), the phenoxy resin (C) and the vinyl copolymer (E) first and then mixing the mixture with the polyphenylene ether resin (A).

As required, substances other than the ingredients (A) to (E) may be incorporated in the resin composition of this invention. Such substances include, for example, resins other than the components (A) to (E), elastomers, fire retardants, fire retarding aids, stabilizers, ultraviolet absorbers, plasticizers, lubricants, pigments and fillers.

The other resins include, for example, polystyrene resins, epoxy resins, polyamide resins, polycarbonate resins and polysulfone resins.

Polystyrene resins, especially those which contain at least 25% by weight of the structural units of the following formula (V)

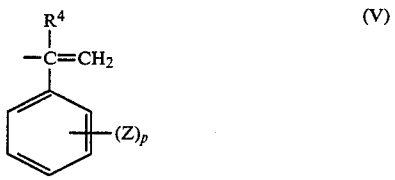

wherein $R^4$, Z and p are as defined with regard to formula (II), are preferred as the other resins.

The lower alkyl group in general formula (V) is preferably an alkyl group having 1 to 3 carbon atoms, such as methyl, ethyl, n-propyl and isopropyl.

The halogen atom in general formula (V) is preferably chlorine or bromine.

The structural units of formula (V) are derived from a styrene monomer of the above formula (II).

Examples of preferred polystyrene-type resins are polystyrene, high-impact polystyrene (rubber-modified polystyrene, said rubber including polybutadiene, butadiene/styrene copolymer and EPDM), styrene/butadiene copolymer, styrene/butadiene/acrylonitrile copolymer, styrene/acrylonitril copolymer, styrene/alpha-methylstyrene copolymer, poly-p-methyl-styrene, high-impact poly-p-methylstyrene, styrene/acrylic rubber/acrylonitrile copolymer, styrene/alpha-methylstyrene copolymer and styrene/butadiene resinous block copolymer. They may be used either singly or in combination.

Polymers having a Young's modulus at room temperature of $10^5$ to $10^9$ dynes/cm$^2$ (0.1 to 1020 kg/cm$^2$) in accordance with the definition given in A. V. Tobolsky, "Properties and Structures of Polymers" (John Wiley & Sons, Inc., 1960), pages 71 to 78 may be used as the elastomer to be blended with the polyphenylene ether polymer.

Examples of such elastomers include A-B-A' type elastomeric block copolymers (wherein A and A' are blocks resulting from polymerization of an aromatic vinyl compound, and B is a block resulting from polymerization of a conjugated diene), A-B'-A' type elastomeric block copolymers (wherein A and A' are the same as above, and B' is a block resulting from hydrogenation of the block B above), polybutadiene, an elastomeric copolymer of a diene compound and an aromatic vinyl compound, nitrile rubber, ethylene/propylene copolymer, ethylene/propylene/diene copolymer (EPDM), thiokol rubbers, polysulfide rubbers, acrylic rubbers, a grafted product of butyl rubber and polyethylene, polyurethan rubbers, and polyester elastomers. Of these, the A-B-A' type and A-B'-A' elastomeric block copolymers are preferred, and those in which the molecular weight of the block B or B' is higher than the total sum of the molecular weight of the block A and the molecular weight of the block A' are especially preferred. The block A or A' is, for example, a homoblock or co-block resulting from the polymerization of a monocyclic aromatic vinyl compound such as styrene, alpha-methylstyrene, vinyltoluene, vinylxylene or ethylvinylxylene, or a polycyclic aromatic vinyl compound such as vinylnaphthalene, and preferably has a molecular weight of about 2,000 to about 100,000. The block B is, for example, an elastomeric block resulting from the polymerization of a conjugated diene compound such as 1,3-butadiene, 2,3-dimethylbutadiene, isoprene and 1,3-pentadiene. The block B' results from the hydrogenation of the block B. The block B or B' preferably has a molecular weight of about 25,000 to about 1,000,000.

The other resin such as polystyrene resins is used in a proportion of preferably about 1 to 50% by weight, more preferably about 1 to 30% by weight, in the resin composition of this invention. The elastomer is used in a proportion of preferably 1 to 50% by weight, more preferably about 1 to 20% by weight, in the resin composition of this invention.

Specific examples of the fire retardants include phosphoric acid esters such as triphenyl phosphate, tricresyl phosphate, phosphates obtained by using a mixture of isopropylphenol and phenol as a hydroxy compound and phosphates obtained by using difunctional phenols such as benzohydroquinone or bisphenol A and other alcohols or phenols as a hydroxyl compound; brominated compounds typified by decabromobiphenyl, pentabromotoluene, decabromobiphenyl ether, hexabromobenzene and brominated polystyrene; nitrogen-containing compounds such as cyanuric acid derivatives and melamine derivatives.

Specific examples of the fire retarding aids include compounds of antimony, boron, zinc or iron.

Examples of the stabilizers are sterically hindered phenols, phosphonites and phosphites.

Examples of the ultraviolet absorbers are salicylate compounds, oxalic acid diamide compounds, benzotriazoles and sterically hindered amine compounds.

Examples of the lubricants are polyethylene waxes, polypropylene waxes and paraffins.

Examples of the pigments are titanium dioxide, zinc sulfide and zinc oxide.

Examples of the fillers include mineral fillers such as glass fibers, glass beads, asbestos, wollastonite, mica, talc, clay, calcium carbonate, magnesium hydroxide, silica, potassium titanate fibers, diatomaceous earth and rock wool, inorganic fillers typified by aluminum flakes, zinc flakes, and fibers of metals such as brass, aluminum and zinc, and organic fillers typified by carbon fibers.

The following aids may be incorporated in the resin composition of this invention in order to have the unique properties of the composition exhibited more effectively. Examples of the aids include organic bases such as trimethylamine, triethylamine, diethylenetriamine, triethylenetetramine, dimethylaminopropylamine, N-aminoethylpiperazine, benzyldimethylamine, metaphenylenediamine, diaminodiphenylmethane, xylylenediamine, ethylmethylimidazole, phenylimidazole and 2-phenyl-4-methyl-5-hydroxymethylimidazole; organic acids such as dodecylsuccinic anhydride, hexahydrophthalic anhydride, Methyl Nadic Anhydride, pyromellitic anhydride and benzophenonecarboxylic anhydride; and peroxides such as benzoyl peroxide, dicumyl peroxide and tert-butyl peroxide.

The resulting polyphenylene ether resin compositions of this invention have better mechanical properties, solvent resistance and moldability than a composition obtained by incorporating only a polyester resin in a polyphenylene ether. The resin composition of this invention containing the components (D), and/or (E) has very unique properties, and shows markedly improved solvent resistance, mechanical strength, above all tensile strength, and oil resistance over the resin composition of this invention not containing the components (D) and/or (E). It is not entirely clear why such unique effects are produced in the polyphenylene ether resin compositions of this invention. Journal of Applied Polymer Science, Vol. 23, pages 645-659 (1979), for example, states that when a mixture of a polyester resin and a phenoxy resin is heated and kneaded, a chemical linkage is formed between the two resins owing to ester-interchange reaction. In view of this statement, it is presumed that in the resin composition of this invention, too, a chemical linkage is formed between the polyester resin and the phenoxy resin at the time of heating and kneading them. Furthermore, at this time, the unsaturated carboxylic acid, the vinyl copolymer or the polyphenylene ether also participates in the reaction to induce, for example, an esterification reaction between the unsaturated carboxylic acid with the hydroxyl groups of the phenoxy resin, and the radical reaction of the methyl groups of the polyphenylene ether with the unsaturated bond of the unsaturated carboxylic acid which is bonded to the phenoxy resin by the esterification reaction. When the alpha,beta-unsaturated dicarboxylic acid is used, the terminal hydroxyl group of the polyphenylene ether and the hydroxyl group of the phenoxy resin would also be linked by ester groups. It is believed therefore that consequently, a blended state not seen in conventional compositions is generated among the polyphenylene ether, the polyester resin, the phenoxy resin and the unsaturated carboxylic acid and/or the vinyl copolymer, and leads to the aforesaid unique effects of the resin composition of this invention.

The following Examples and Comparative Examples illustrate the polyphenylene ether resin compositions of this invention.

EXAMPLE 1

Twenty-five parts by weight of 2,6-dimethylphenol/2,3,6-trimethylphenol copolymer (the proportion of 2,3,6-trimethylphenol 5 mole %) having an intrinsic viscosity, measured at 25° C. in chloroform as a solvent, of 0.51 dl/g was dry-blended with 75 parts by weight of pellets which had been obtained by melt-mixing a mixture of 80% by weight of polyethylene terephthalate ("RE 500", a product of Toyobo Co., Ltd.; DSC melting point 260° C.) and 20% by weight of a phenoxy resin (a condensation product of biphenol A and epichlorohdyrin having a solution viscosity, measured in a methyl ethyl ketone solution having a solids concentration of 40% by weight, of about 5,500 cp and a molecular weight of about 29,000; commercially available under the trade name "PHENOXY RESIN PKHH" from Union Carbide Corporation) at about 300° C. by using an extruder. The resulting mixture was melt-kneaded at 300° C. by an extruder (the mixture contained the polyphenylene ether, polyethylene terephthalate and phenoxy resin in a weight ratio of 25:60:15) and extruded to form pellets.

A test sample having a thickness of ⅛ inch was prepared from the resulting pellets by using an injection molding machine, and its tensile strength was measured. To evaluate solvent resistance, the pellets were extracted with chloroform by a Soxhlet extractor, and the content of the chloroform-insoluble portion was determined.

The results are shown in Table 1.

As can be seen from Table 1, the amount of the chloroform-insoluble portion was larger than the amount of the polyester resin used. Since the components other than the polyester resin are soluble in chloroform, the above results are believed to show that a chemical linkage formed between the polyester resin and the phenoxy resin.

COMPARATIVE EXAMPLE 1

Example 1 was repeated except that high-impact polystyrene (containing a polystyrene matrix having an intrinsic viscosity, measured at 25° C. in chloroform as a solvent, of 0.89 dl/g with a gel content of 16% by weight) was used instead of the phenoxy resin. The results are also shown in Table 1.

EXAMPLE 2

The same polyphenylene ether, polyethylene terephthalate and phenoxy resin as used in Example 1 were used in an amount of 50, 40 and 10 parts by weight respectively, and simultaneously melt-kneaded at 300° C. in an extruder. The tensile strength and the content of the chloroform-insoluble portion were measured in the same way as in Example 1. The results are shown in Table 1.

COMPARATIVE EXAMPLE 2

Example 2 was repeated except that the same high-impact polystyrene as used in Comparative Example 1 was used instead of the phenoxy resin. The results are shown in Table 1.

EXAMPLE 3

Example 1 was repeated except that the amounts of the polyphenylene ether, polyethylene terephthalate and phenoxy resin were changed to 75, 20, and 5 parts by weight respectively. The results are shown in Table 1.

COMPARATIVE EXAMPLE 3

Example 3 was repeated except that the same high-impact polystyrene resin as used in Comparative Example 1 was used instead of the phenoxy resin. The results are shown in Table 1.

EXAMPLE 4

Example 1 was repeated except that 25 parts by weight of the polyphenylene ether copolymer in Example 1 was changed to 50 parts by weight of poly(2,6-dimethyl-1,4-phenylene)ether having an intrinsic viscosity, measured at 25° C. in chloroform as a solvent, of 0.50 dl/g, and the amounts of the polyethylene terephthalate and phenoxy resin were changed to 45 and 5 parts by weight, respectively. The results are shown in Table 1.

COMPARATIVE EXAMPLE 4

Example 4 was repeated except that the same high-impact polystyrene as used in Comparative Example 1 was used instead of the phenoxy resin. The results are shown in Table 1.

EXAMPLE 5

The same polyphenylene ether, polyethylene terephthalate and phenoxy resin as used in Example 1 were used in an amount of 20, 54 and 6 parts by weight, and were simultaneously melt kneaded with 20 parts by weight of the same high-impact polystyrene as used in Comparative Example 1 at about 300° C. in an extruder. The tensile strength and the content of the chloroform-insoluble portion were measured in the same way as in Example 1. The results are shown in Table 1.

COMPARATIVE EXAMPLE 5

Example 5 was repeated except that the phenoxy resin was not used, and the amount of the high-impact polystyrene was changed to 26 parts by weight. The results are shown in Table 1.

EXAMPLE 6

Forty parts by weight of the same polyphenylene ether as used in Example 1 and 20 parts by weight of the same high-impact polystyrene as used in Comparative Example 1 were mixed with 40 parts by weight of pellets which had been obtained by melt kneading the same polyethylene terephthalate and phenoxy resin as used in Example 1 in a weight ratio of 80:20 in an extruder. The mixture was melt kneaded at about 300° C. in an extruder. The tensile strength and the content of the chloroform-insoluble portion were measured in the same way as in Example 1. The results are shown in Table 1.

COMPARATIVE EXAMPLE 6

Example 6 was repeated except that the phenoxy resin was not used, the amount of the high-impact polystyrene was changed to 28 parts by weight, and the individual components were melt-kneaded simultaneously in an extruder. The results are shown in Table 1.

COMPARATIVE EXAMPLE 7

Comparative Example 6 was repeated except that the amount of the polyethylene terephthalate was changed to 40 parts by weight, and the amount of the high-impact polystyrene was changed to 20 parts by weight. The results are shown in Table 1.

TABLE 1

| | Composition (parts by weight) | | | | Properties | | |
|---|---|---|---|---|---|---|---|
| | | | | | Tensile strength (kg/cm2) | | Chloroform- |
| | Poly-phenylene ether | Poly-ethylene tere-phthalate | Phenoxy resin | High-impact poly-styrene | Non-treated | After annealing (*1) | insoluble portion (wt. %) |
| Ex. 1 | 25 | 60 | 15 | — | 260 | 230 | 72 |
| CEx. 1 | 25 | 60 | — | 15 | 210 | 180 | 60 |
| Ex. 2 | 50 | 40 | 10 | — | 430 | 405 | 48 |
| CEx. 2 | 50 | 40 | — | 10 | 360 | 173 | 40 |
| Ex. 3 | 75 | 20 | 5 | — | 550 | 496 | 24 |
| CEx. 3 | 75 | 20 | — | 5 | 468 | 230 | 20 |
| Ex. 4 | 50 | 45 | 5 | — | 383 | — | 48 |
| CEx. 4 | 50 | 45 | — | 5 | 320 | — | 45 |
| Ex. 5 | 20 | 54 | 6 | 20 | 263 | — | 58 |
| CEx. 5 | 20 | 54 | — | 26 | 210 | — | 54 |
| Ex. 6 | 40 | 32 | 8 | 20 | 410 | 380 | 38 |
| CEx. 6 | 40 | 32 | — | 28 | 330 | 210 | 32 |
| CEx. 7 | 40 | 40 | — | 20 | 310 | 180 | 40 |

(*): Annealing was carried out at 100° C. for 10 hours.
Ex. = Example; CEx. = Comparative Example

EXAMPLE 7

A mixture composed of 49 parts by weight of polyethylene terephthalate (RE500), 4 parts by weight of a phenoxy resin (PHENOXY RESIN PKHH), and 22 parts by weight of a styrene/maleic anhydride copolymer (DYLARK #232 sold by ARCO Company of U.S.A.; a melt index, measured at 200° C. under a load of 5 kg, 2.2 g/10 minutes; to be abbreviated as "SMA resin") was melted and mixed at about 300° C. and pelletized.

Seventy-five parts by weight of the resulting pellets and 25 parts by weight of 2,6-dimethylphenol/2,3,6-trimethylphenol copolymer (5 mole % of 2,3,6-trimethylphenol) having an intrinsic viscosity, measured at 25° C. in chloroform as a solvent, of 0.50 dl/g were dry-mixed, and the mixture was kneaded again at 300° C. in an extruder (the resulting mixture contained the polyphenylene ether, polyethylene terephthalate, phenoxy resin and SMA resin in a weight ratio of 25:49:4:22) and extruded to form pellets.

A dumbbell test specimen, ⅛ inch thick, was prepared from the resulting pellets by an injection molding machine, and its tensile strength was measured. For evaluating solvent resistance, the pellets were extracted with chloroform by a Soxhlet extractor, and the content of the chloroform-insoluble portion was measured.

The results are shown in Table 2.

It is seen from Table 2 that the amount of the chloroform-insoluble portion was greater than the amount of the polyester resin used and also than the total amount of the polyester resin and the phenoxy resin. In view of the fact that the components other than the polyester resin are soluble in chloroform, it is believed that a chemical linkage formed between the polyester resin and the other resin components and contributed to the improvement of the solvent resistance.

EXAMPLE 8

Example 7 was repeated except that 0.1 part by weight, per 100 parts by weight of the entire resin components, of 2-phenyl-4-methyl-5-hydroxymethylimidazole was further added as an aid to the composition of Example 7. The results are shown in Table 2. It is seen that a further improvement was achieved in tensile strength and solvent resistance.

thylimidazole was further added as an aid to the composition of Example 9. The results are shown in Table 2.

COMPARATIVE EXAMPLE 9

Forty parts by weight of the same polyphenylene ether as used in Example 7, 26 parts by weight of the same polyethylene terephthalate as used in Example 7 and 34 parts by weight of the same high-impact polystyrene as used in Comparative Example 8 were mixed, and by using an extruder melted at 300° C., mixed and pelletized.

Test samples were prepared from the resulting pellets by the same procedure as in Example 7, and the same tensile strength measurement and extraction test as in Example 7 were carried out. The results are shown in Table 2.

COMPARATIVE EXAMPLE 10

The same procedure as in Example 10 was repeated except that the SMA resin was not used, and the amount of the high-impact polystyrene was changed to 28 parts by weight. The results are shown in Table 2.

TABLE 2

|  | Composition (parts by weight) | | | | | Properties | | |
| --- | --- | --- | --- | --- | --- | --- | --- | --- |
|  |  |  |  |  |  | Tensile strength (kg/cm2) | | Chloroform- |
|  | PPE (*1) | PET (*2) | Phenoxy resin | SMA resin (*3) | HIPS (*4) | Non-treated | After annealing (*5) | insoluble portion (wt. %) |
| Ex. 7 (*6) | 25 | 49 | 4 | 22 | — | 330 | 320 | 60 |
| Ex. 8 | 25 | 49 | 4 | 22 | — | 350 | 320 | 65 |
| CEx. 8 | 25 | 49 | — | — | 26 | 200 | 190 | 49 |
| Ex. 9 (*6) | 40 | 26 | 6 | 8 | 20 | 480 | 500 | 35 |
| Ex. 10 | 40 | 26 | 6 | 8 | 20 | 510 | 508 | 37 |
| CEx. 10 | 40 | 26 | — | — | 34 | 350 | 220 | 26 |
| CEx. 11 | 40 | 26 | 6 | — | 28 | 420 | 390 | 31 |

(*1): Polyphenylene ether copolymer;
(*2): Polyethylene terephthalate;
(*3): Styrene/maleic anhydride copolymer;
(*4): High-impact polystyrene;
(*5): Annealing was carried out at 100° C. for 10 hours;
(*6): 2-Phenyl-4-methyl-5-hydroxymethylimidazole was added.

COMPARATIVE EXAMPLE 8

Example 7 was repeated except that 26 parts by weight of high-impact polystyrene (containing a polystyrene matrix having an intrinsic viscosity, measured at 25° C. in chloroform as a solvent, of 0.89 dl/g with a gel content of 16% by weight) was used instead of 4 parts by weight of the phenoxy resin and 22 parts by weight of the SMA resin. The results are shown in Table 2.

EXAMPLE 9

Example 7 was repeated except that the amounts of the polyphenylene ether, polyethylene terephthalate, phenoxy resin and SMA resin were changed respectively to 40, 26, 6 and 8 parts by weight, and 20 parts by weight of the same high-impact polystyrene as used in Comparative Example 8 was further added. The results are shown in Table 2. It is seen that a marked improvement was seen in tensile strength and solvent resistance over the compositions obtained in Comparative Examples 10 and 11 to be given hereinafter.

EXAMPLE 10

Example 9 was repeated except that 0.1 part by weight, per 100 parts by weight of the entire resin components, of 2-phenyl-4-methyl-5-hydroxyme-

EXAMPLE 11

A mixture composed of 41.1 parts by weight of polybutylene terephthalate (to be abbreviated as "PBT"; N-1000, a product of Mitsubishi Rayon Co., Ltd.; DSC melting point about 230° C.), 4.6 parts by weight of a phenoxy resin (PHENOXY RESIN PKHH) and 2.3 parts by weight of maleic anhydride was melted and mixed at 200° to 260° C. and pelletized.

Forty-eight parts by weight of the resulting pellets, 32 parts by weight of 2,6-dimethylphenol/2,3,6-trimethylphenol copolymer (5 mole % of 2,3,6-trimethylphenol) having an intrinsic viscosity, measured at 25° C. in chloroform as a solvent, of 0.52 dl/g, and 20 parts by weight of glass fibers ("CSO3MA429-1", a product of Asahi Fiberglass Co., Ltd.) were melted and kneaded at 280° C. by using an extruder (the resulting mixture contained the polyphenylene ether, PBT, phenoxy resin maleic anhydride and glass fibers in a weight ratio of 32:41.1:4.6:2.3:20) to form pellets.

A dumbbell test specimen, ⅛ inch thick, was prepared from the pellets by means of an injection molding machine, and its tensile strength was measured. To evaluate solvent resistance, the pellets were extracted with chloroform by a Soxhlet extractor, and the amount of the chloroform-insoluble portion was measured. The results are shown in Table 3.

It is seen from Table 3 that the amount of the chloroform-insoluble portion was larger than the amount of the polyester resin used and also than the total amount of the polyester resin and the phenoxy resin, and also than the total amount of the polyester resin, the phenoxy resin and maleic anhydride. Thus even a portion of the polyphenylene ether became insoluble in chloroform. In view of the fact that the components other than the polyester resin are soluble in chloroform, the above results are believed to mean that a chemical linkage formed between the polyester resin and the other resin components and contributed to the improvement of solvent resistance and mechanical strength.

COMPARATIVE EXAMPLE 12

Example 11 was repeated except that maleic anhydride was not used, and the amounts of PBT and the phenoxy resin were changed respectively to 43.2 and 4.8 parts by weight. The results are shown in Table 3. A comparison of the results of Example 11 with those of Comparative Example 12 shows that the composition of this invention had improved tensile strength and solvent resistance.

COMPARATIVE EXAMPLE 13

Comparative Example 12 was repeated except that the phenoxy resin was not used, and the amount of PBT was changed to 48 parts by weight. The results are shown in Table 3.

EXAMPLE 12

Example 11 was repeated except that the amounts of PBT, the phenoxy resin and maleic anhydride were changed to 43.4, 2.3 and 2.3 parts by weight, respectively. The results are shown in Table 3.

COMPARATIVE EXAMPLE 14

Example 12 was repeated except that maleic anhydride was not used, and the amounts of PBT and the phenoxy resin were changed to 45.6 and 2.4 parts by weight, respectively. The results are shown in Table 3.

EXAMPLE 13

Example 11 was repeated except that the amounts of the polyphenylene ether, polybutylene terephthalate, phenoxy resin and maleic anhydride were changed respectively to 25, 64.3, 7.1 and 3.6 parts by weight, and the glass fibers were not used. The results are shown in Table 3.

COMPARATIVE EXAMPLE 15

Example 13 was repeated except that maleic anhydride was not used, and the amounts of PBT and the phenoxy resin were changed to 67.5 and 7.5 parts by weight, respectively. The results are shown in Table 3.

EXAMPLE 14

Example 13 was repeated except that the amounts of the polyphenylene ether, PBT, phenoxy resin and maleic anhydride were changed respectively to 40, 52.8, 4.3 and 2.9 parts by weight. The results are shown in Table 3.

COMPARATIVE EXAMPLE 16

Example 14 was repeated except that maleic anhydride was not used, and the amounts of PBT and the phenoxy resin were changed to 54 and 6 parts, respectively. The results are shown in Table 3.

COMPARATIVE EXAMPLE 17

Example 14 was repeated except that maleic anhydride and the phenoxy resin were not used, and the amount of PBT was changed to 60 parts by weight. The results are shown in Table 3.

EXAMPLE 15

Example 13 was repeated except that the amounts of the polyphenylene ether, PBT, phenoxy resin and maleic anhydride were changed respectively to 75, 21.4, 2.4 and 1.2 parts by weight. The results are shown in Table 3.

COMPARATIVE EXAMPLE 18

Example 15 was repeated except that maleic anhydride was not used, and the amounts of PBT and the phenoxy resin were changed respectively to 22.5 and 2.5 parts, respectively. The results are shown in Table 3.

EXAMPLE 16

Example 14 was repeated except that 52.8 parts by weight of PBT was changed to 48.8 parts by weight of polyethylene terephthalate ("RE 500"; "PET" for short) and the amounts of the phenoxy resin and maleic anhydride were changed each to 5.6 parts by weight. The results are shown in Table 3.

COMPARATIVE EXAMPLE 19

Example 16 was repeated except that maleic anhydride was not used, and the amounts of PET and the phenoxy resin were changed to 50 and 10 parts by weight, respectively. The results are shown in Table 3.

TABLE 3

| | Composition (parts by weight) | | | | | Tensile strength (kg/cm2) | Chloroform-insoluble portion (wt. %) |
|---|---|---|---|---|---|---|---|
| | PPE (*1) | PBT or PET | Phenoxy resin | MAn (*2) | GF (*3) | | |
| Ex. 11 | 32 | PBT 41.1 | 4.6 | 2.3 | 20 | 1000 | 75 |
| CEx. 12 | 32 | PBT 43.2 | 4.8 | — | 20 | 770 | 67 |
| CEx. 13 | 32 | PBT 48.0 | — | — | 20 | 570 | 68 |
| Ex. 12 | 32 | PBT 43.4 | 2.3 | 2.3 | 20 | 970 | 73 |
| CEx. 14 | 32 | PBT 45.6 | 2.4 | — | 20 | 690 | 66 |
| Ex. 13 | 25 | PBT 64.3 | 7.1 | 3.6 | — | 340 | — |
| CEx. 15 | 25 | PBT 67.5 | 7.5 | — | — | 280 | — |
| Ex. 14 | 40 | PBT 52.8 | 4.3 | 2.9 | — | 490 | — |
| CEx. 16 | 40 | PBT 54.0 | 6.0 | — | — | 360 | — |
| CEx. 17 | 40 | PBT 60.0 | — | — | — | 230 | — |

TABLE 3-continued

| | Composition (parts by weight) | | | | | Properties | |
|---|---|---|---|---|---|---|---|
| | PPE (*1) | PBT or PET | Phenoxy resin | MAn (*2) | GF (*3) | Tensile strength (kg/cm2) | Chloroform-insoluble portion (wt. %) |
| Ex. 15 | 75 | PBT 21.4 | 2.4 | 1.2 | — | 602 | — |
| CEx. 18 | 75 | PBT 22.5 | 2.5 | — | — | 470 | — |
| Ex. 16 | 40 | PET 48.8 | 5.6 | 5.6 | — | 420 | — |
| CEx. 19 | 40 | PET 50.0 | 10.0 | — | — | 380 | — |

(*1): Polyphenylene ether;
(*2): Maleic anhydride;
(*3): Glass fibers

What is claimed is:

1. A polyphenylene ether resin composition comprising
   (A) a polyphenylene ether resin,
   (B) an aromatic polyester resin,
   (C) a phenoxy resin produced by polycondensing a bisphenol with an epihalohydrin, and
   (D) an unsaturated carboxylic acid.

2. The composition of claim 1 wherein the polyphenylene ether resin is a phenylene ether homopolymer, a phenylene ether random copolymer or a grafted phenylene ether polymer obtained by grafting an aromatic vinyl compound represented by the following formula

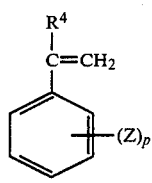

wherein $R^4$ represents a hydrogen atom or a methyl group, Z represents a halogen atom or a lower alkyl group having 1 to 3 carbon atoms, and p is 0 or an integer of 1 to 3, to the homo- or co-polymer of the polyphenylene ether.

3. The composition of claim 1 wherein the aromatic polyester resin is derived from an aromatic dicarboxylic acid as a dicarboxylic acid component and an aliphatic diol having 2 to 10 carbon atoms as a glycol component.

4. The composition of claim 1 wherein the total weight of the components (B), (C) and (D) is 5 to 95% by weight based on the total weight of the components (A), (B) (C) and (D).

5. The composition of claim 4 wherein based on the total weight of the components (B), (C) and (D), the proportion of the component (B) is 10 to 98.5% by weight, the proportion of the component (C) is 1 to 89.5% by weight, and the proportion of the component (D) is 0.5 to 89% by weight.

6. The composition of claim 1 wherein the bisphenol is composed mainly of recurring units of the formula

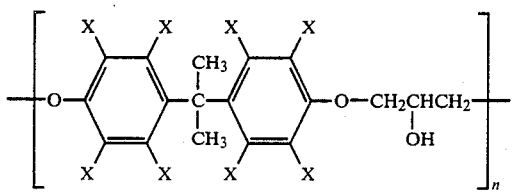

wherein the X's are identical or different and each represents a hydrogen atom, a lower alkyl group having 1 to 3 carbon atoms, or a halogen atom, and n is a number of at least 20.

7. The composition of claim 1 wherein the polyphenylene ether resin is a homo or copolymer.

8. The composition of claim 7 wherein the polyphenylene ether homo or copolymer is obtained by polycondensing one or more monocyclic phenols represented by the following formula

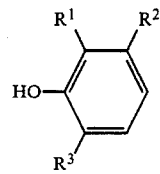

wherein $R^1$ represents a lower alkyl group having 1 to 3 carbon atoms, and $R^2$ and $R^3$, independently from each other, represent a hydrogen atom or an alkyl group having 1 to 3 carbon atoms.

* * * * *